No. 724,892. PATENTED APR. 7, 1903.
J. T. LANGFORD.
CEMENT LINED PIPE.
APPLICATION FILED JUNE 16, 1902.
MODEL.

Witnesses:
Edwin T. Luce
Nathan C. Lombard 2nd

Inventor:
John T. Langford
by ........ Atty.

UNITED STATES PATENT OFFICE.

JOHN T. LANGFORD, OF NEWTON, MASSACHUSETTS.

CEMENT-LINED PIPE.

SPECIFICATION forming part of Letters Patent No. 724,892, dated April 7, 1903.

Application filed June 16, 1902. Serial No. 111,866. (Model.)

*To all whom it may concern:*

Be it known that I, JOHN T. LANGFORD, a citizen of the United States, and a resident of Newton, in the county of Middlesex and State of Massachusetts, have invented certain new and useful Improvements in Cement-Lined Pipes, of which the following is a specification.

This invention relates to improvements in cement-lined pipes particularly designed as conduits for water or electric wires, and it is carried out as follows, reference being had to the accompanying drawings, wherein—

Figure 1:
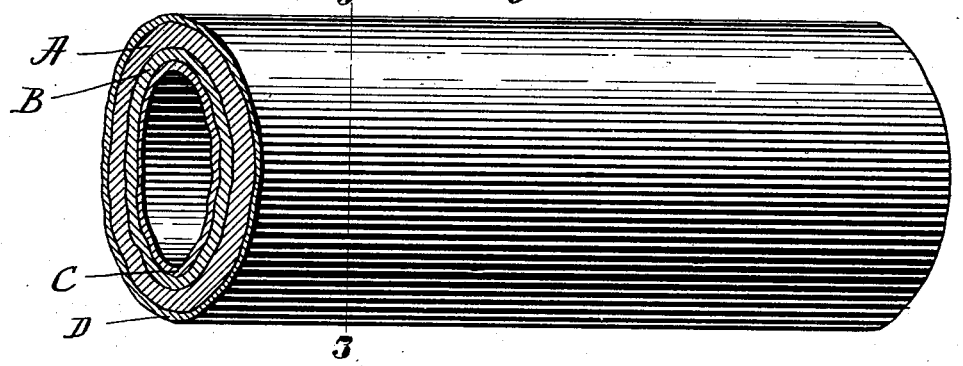
Figure 2:
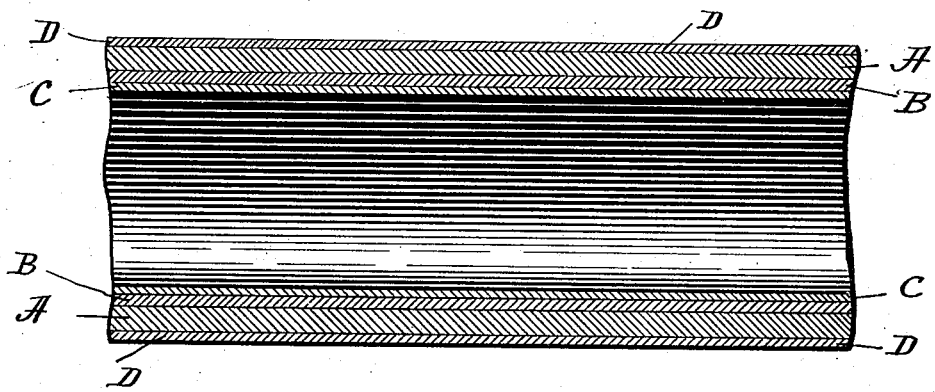
Figure 3:
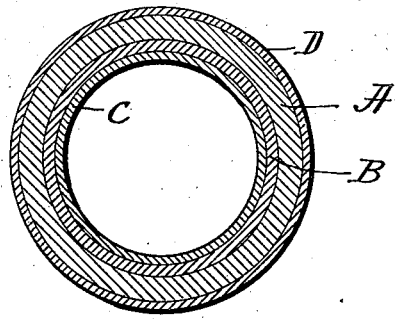

Figure 1 is a side elevation of my invention.
Fig. 2 is a longitudinal section of the same, and Fig. 3 is a cross-section on the line 3 3 shown in Fig. 1.

Similar letters refer to similar parts wherever they occur on the different parts of the drawings.

In the drawings, A represents a metal pipe, either cast, drawn, or riveted in the usual manner. The interior of such pipe is provided with a suitable dried cement lining B.
The cement lining of metal pipes as usually made is liable to be porous and in such condition will absorb moisture conductive to electric currents, which is disadvantageous, particularly if the pipes are used as conductors for electric wires. Such cement-lined pipes are usually not smooth on the interior of the lining, and if used as conduits for liquids are liable to become impregnated and coated with impurities contained in the water or liquid, and if used for electric wires causing friction in drawing the wires through the pipes, and to obviate such objections I construct my improved cement-lined pipe as follows: The interior of the said cement lining B is coated smoothly with Japan enamel-paint or similar coating C, which serves as a non-absorbent for liquids and moisture, thus rendering the pipe particularly well adapted as a conduit for electric wires. As a preventive for corrosion of the exterior of the metal pipe A, I apply to it a coating of Japan enamel or similar liquid or plastic material D, as shown in the drawings.

What I wish to secure by Letters Patent and claim is—

1. The combination with a metallic pipe, of a lining of cement provided on its interior with a smooth coating of japan, substantially as described.

2. A new article of manufacture comprising a metallic pipe provided with a lining of hydraulic cement, the interior of said lining and the exterior of the metallic pipe being provided with a smooth coating of japan, substantially as described.

In testimony whereof I have affixed my signature in presence of two witnesses.

JOHN T. LANGFORD.

Witnesses:
ALBAN ANDRÉN,
ELIZABETH L. ROBINSON.